United States Patent Office 3,467,735
Patented Sept. 16, 1969

3,467,735
HYDROXYL ARYL ESTERS OF PHOSPHOROUS ACID
Byron A. Hunter, Woodbridge, Conn., assignor to Uniroyal, Inc., a corporation of New Jersey
No Drawing. Filed Nov. 8, 1965, Ser. No. 506,860
Int. Cl. C07f 9/12; C08c 11/66; C08d 11/04
U.S. Cl. 260—953
9 Claims

ABSTRACT OF THE DISCLOSURE

Hydroxy aryl esters of phosphorous acid having the formula $$(LO)_xP(OM)_y$$

where M is hydrocarbon (especially alkyl or alkyl phenyl, e.g., butyl, nonyl, nonyl phenyl) $x$ is 1 to 3, $y$ is 0 to 2, $x$ plus $y$ equals 3, and L is

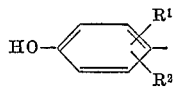

where $R^1$ is secondary alkyl (e.g. alpha-methyl undecyl), terpenyl or aralkyl, and $R^2$ is hydrogen or one of the values stated for $R^1$. A typical product is made by reacting hydoquinone with dodecene-1 to produce 2,5-bis(alpha-methyl undecyl) hydroquinone; this is then reacted with phosphorus trichloride (or with mono-nonyl phenoxy phosphorus dichloride made by reacting phosphorus trichloride with mononyl phenol). Added to SBR latex, the chemicals make good stabilizers for the polymer.

---

This invention relates to improvements in stabilizer chemicals and their use in rubber.

The use of alkylated aryl phosphite compounds as stabilizers in synthetic rubbers is known. See, for example, U.S. Patents Nos. 2,419,354; 2,612,488; 2,732,365; 2,733,-226; 2,877,259; 2,968,670; 3,112,286.

An object of the present invention is to provide new organic phosphorus compounds having exceptional antioxidant activity. Another objective is to provide stabilizers for synthetic rubbers which exhibit superior effects in retarding the deterioration of polymers subjected to aging influences such as heat and oxygen. A further objective is to provide commercially practical aryl esters of phosphorous acid which exhibit good resistance to hydrolysis and remain effective as deterioration retarders through the processing operations normally associated with the commercial manufacture of synthetic rubbers. Another objective is to provide a novel stabilized rubber latex. A still further objective is to provide novel and effective antioxidants for rubber vulcanizates.

The above objectives have been accomplished by the discovery of a new class of synthetic rubber stabilizers consisting of novel hydroxy aryl esters of phosphorus acid. The compounds of the invention can be represented by the following general structure:

$$(LO)_xP(OM)_y$$

wherein each M is a hydrocarbon group, $x$ is from 1 to 3, $y$ is from 0 to 2, and $x$ plus $y$ equals 3, and L represents a group of the formula

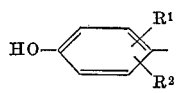

where $R^1$ is selected from the group consisting of secondary alkyl, terpenyl and aralkl and $R^2$ is selected from the group consisting of hydrogen, alkyl, terpenyl and aralkyl. Where more than one L group is present these may be the same or different. Likewise where more than one M group is present these may be the same or different. Similarly where $R^2$ is other than hydrogen, it may be the same as or different from $R^1$.

Substituted para hydroxy phenyl phosphites of the invention may be obtained, according to one method of preparation, by reacting an appropriately substituted hydroquinone with insufficient phosphorus trichloride to react with both hydroxyl groups of the hydroquinone, that is, not more than one-third mole of phosphorous trichloride per mole of substituted hydroquinone. The substituted hydroquinones used for this purpose are those made by reacting alpha-olefins with hydroquinone (R= secondary alkyl in the formula above), or by reacting a terpene with hydroquinone (R=terpenyl in the formula above), or by reacting a styrene with hydroquinone (R= aralkyl in the formula above).

The chemicals of the invention are remarkably useful in the preparation of stabilized synthetic rubber compositions.

U.S. Patent 2,058,343 issued to Moran et al. on Oct. 20, 1936 refers to compounds described as the reaction products resulting from the reaction of tri-molecular amounts of phenol or substituted phenol with a molecule of phosphorous trichloride. In one example a material referred to as "triphosphite of hydroquinone," not otherwise described, is shown as a stabilizer for motor oil. This product is apparently less effective than triphenyl phosphite, triorthocresyl phosphite, and the like, from the standpoint of forestalling corrosion of metal exposed to the oil under oxidative conditions.

In any case, the reaction product of three moles of hydroquinone with one mole of phosphorous trichloride is not found to display the effectiveness desired in a stabilizer composition for polymers, unlike the chemicals of the invention derived from hydroquinone substituted with secondary alkyl, terpenyl, or aralkyl groups.

Nelson, U.S. Patent 2,612,488, issued Sept. 30, 1952, discloses aryl phosphite compositions, obtained from dihydric phenols, which are described as polyphosphites.

Morris, U.S. Patent 3,112,286, Nov. 26, 1963, discloses phenolic phosphites derived from bisphenols.

In the chemicals of the invention having the above-stated formula $(LO)_xP(OM)_y$ wherein L is a substituted p-hydroxy phenyl group

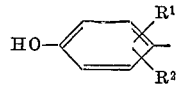

the substituents are preferably in the 2- and 5-positions (interchangeably). $R^1$ and $R^2$ may as indicated be the same or different, and preferably each represents (a) secondary alkyl
(b) terpenyl or
(c) aralkyl.

When $R^1$ and/or $R^2$ is secondary alkyl, it may contain from 3 to 28 carbon atoms, preferably 6 to 20 carbon atoms, as represented by such groups as isopropyl, secondary butyl, sec. amyl, sec. hexyl. Secondary alkyl groups derived from alpha-olefins are useful groups, such as are obtained by reacting hydroquinone with mixed alpha-olefins, for example, such as $C_6$–$C_{10}$ mixed alpha-olefins, $C_{12}$–$C_{16}$ mixed alpha-olefins, $C_{14}$–$C_{18}$ mixed alpha-olefins, or $C_{16}$–$C_{20}$ mixed alpha-olefins.

When $R^1$ and/or $R^2$ is a terpenyl radical suitable starting products are provided by reacting hydroquinone with one or more terpenes, which may be defined as including the $C_{10}H_{16}$ hydrocarbons of what has been termed isoprenoid structure. The terpenes may be monocyclic, polycyclic or acyclic. The terpenes are represented by such materials as alpha-pinene, betapinene, camphene, limonene, carene, dipentene, terpenene, and the like. Mixed products of natural origin, such as turpentine (largely alpha-pinene with varying quantities of betapinene and other terpenes, depending upon the source) are suitable sources of the terpenyl group. Equivalent to the foregoing terpene radicals for purposes of the invention is the isobornyl radical as provided for example by reacting camphene or the like with hydroquinone.

$R^1$ and/or $R^2$ as an aralkyl radical is exemplified by alpha-methyl benzyl, alpha, alpha'-dimethyl benzyl, etc. This class of chemicals of the invention is typically derived from reaction products of hydroquinone with styrene (in which case R is alpha-methyl benzyl), alpha-methyl styrene (in which case R is alpha-alpha'-dimethyl benzyl), or the like.

Group M in the above general formula is, as stated, a hydrocarbon group. For example, group M may be alkyl, aryl, alkaryl or aralkyl. Particularly useful products are obtained when M is an alkylated phenyl group such as butyl phenyl, octyl phenyl, nonyl phenyl, dinonyl phenyl, dodecyl phenyl, etc. M may also be alkyl such as butyl, octyl, decyl, tridecyl, octadecyl, etc. Such alkyl groups may be normal or branched.

In general it will be seen that the compounds of my invention are distinguished from phosphites previously disclosed as synthetic rubber stabilizers in particular that my compounds contain at least one 4-hydroxy phenyl as an esterifying group in the phosphite molecule.

Many of the stabilizers of the invention are produced by reacting phosphorous trichloride with an appropriately substituted hydroquinone, as indicated, or by reacting phosphorus trichloride consecutively with a hydrocarbon substituted phenol and the appropriately substituted hydroquinone. Alternatively mixed phosphites related to the latter type can be made by treating a mixture of a substituted phenol and an appropriately substituted hydroquinone with the appropriate amount of phosphorus trichloride. The quantity of phosphorus trichloride employed is sufficient to react with all the phenolic groups in the hydrocarbon substituted phenol and half the phenolic groups on the substituted hydroquinone. If desired a solvent such as benzene, toluene, xylene, chlorobenzene or dichlorobenzene may be used.

Another method that can be used to produce phosphites of the invention is to heat a phosphite ester with the substituted hydroquinone. Catalysts may be employed such as those disclosed in U.S. Patent 3,053,878. For example, triphenyl phosphite heated with a secondary-alkyl hydroquinone yields phosphites in which one or more phenyl groups of triphenyl phosphite is replaced by a secondary-alkyl 4-hydroxy phenyl radical. Phenol distills slowly from the reaction mixture leaving the desired product as a residue. Trialkyl phosphites such as tributyl phosphite or tridecyl phosphite can be similarly employed whereby the alcohol distills gradually from the hot reaction mixture.

Mixed aryl alkyl phosphites can also be used. These reactions can be represented by the following equations:

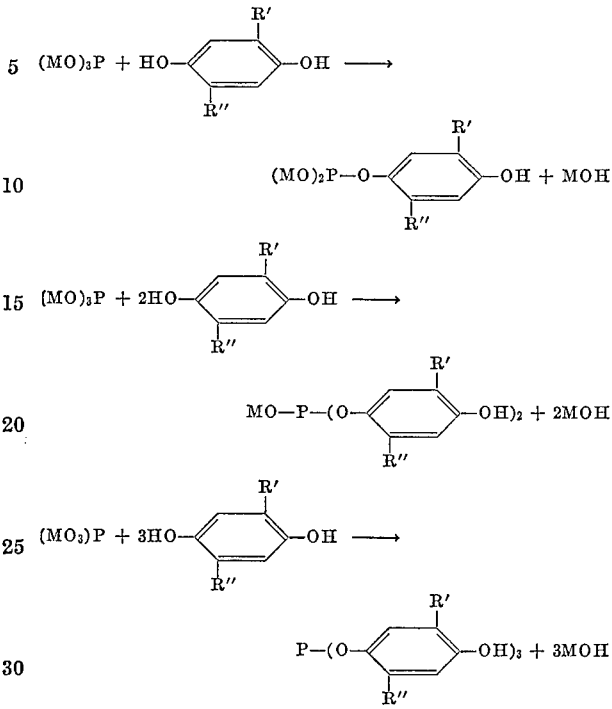

In the foregoing equations M is as previously defined while R' and R" are the same or different and can have the various values previously assigned to $R^1$ and $R^2$ (namely, secondary alkyl, terpenyl, or aralkyl).

It will be understood that any given reaction product of the invention is not necessarily composed of a single chemical of the formula shown, but may be a mixture of chemicals. In the gross reaction products $x$, $y$ and $n$ in the formulas given above may have average values that are not whole numbers. For purposes of the invention it is neither necessary nor desirable to separate pure chemicals from the reaction product. In fact, the crude reaction product may in some cases be more effective than the purified chemical.

One mode of use of the chemicals of my invention involves the addition of relatively small quantities (in the range of 0.5 to 2.0 parts of the chemical per 100 parts of rubber hydrocarbon) as an aqueous emulsion to synthetic rubber latex. Subsequent flocculation of the latex with acid (or with acid and a co-flocculating agent such as sodium chloride) deposits the stabilizing chemical in an effective and well dispersed state within the rubber polymer. For this application it is preferable that the stabilizing agent either be fluid itself or that it be compatible or soluble in other agents that may be added in an emulsified state to the rubber latex. For this purpose low melting or liquid chemicals are preferred. Particularly suited to this need are chemicals which are phosphites prepared from alpha-olefin alkylated hydroquinones. Thus, the phosphite prepared from hydroquinone alkylated with two moles of an olefin such as octadecene-1 is a light colored liquid which is readily emulsified and easily incorporated into synthetic rubber latex. Additionally this product is soluble in oils and also in commercial stabilizing chemicals such as tris(nonylated phenyl) phosphite (described in U.S. Patent 2,733,226). Mixtures of the present substituted hydroquinone phosphites with the stabilizers described in the cited patent afford advantages which are not attained with either material alone. For example, a 90:10 mixture of tris(nonylated phenyl) phosphite and the phosphite obtained by reacting phosphorus trichloride (1 mole) with 3 moles of the reaction product of octadecene-1 with hydroquinone (2:1) affords better protection of styrene-butadiene copolymer (SBR) against heat than does the nonylated phenyl phosphite alone and better polymer color than does the described hydroquinone phosphite alone.

Examples of 4-hydroxy phenyl phosphites of the invention are given in the following partial list:

Tris[2,5-di(secondary butyl)-4-hydroxy phenyl] phosphite
Tris[2,5-(alpha-methyl pentyl)-4-hydroxy phenyl] phosphite
Tris[2,5-bis(alpha-methyl heptyl)-4-hydroxy phenyl] phosphite
Tris[2,5-bis(alpha-methyl nonyl)-4-hydroxy phenyl] phosphite
Tris[2,5-bis(alpha-methyl undecyl)-4-hydroxy phenyl] phosphite
Tris[2,5-bis(alpha-methyl tridecyl)-4-hydroxy phenyl] phosphite
Tris[2,5-bis(alpha-methyl pentadecyl)-4-hydroxy phenyl] phosphite
Tris[2,5-bis(alpha-methyl heptadecyl)-4-hydroxy phenyl] phosphite
Bis[2,5-di(sec. butyl)-4-hydroxyphenyl] (butyl phenyl) phosphite
Bis[2,5-bis(alpha-methyl pentyl)-4-hydroxyphenyl] (nonyl phenyl) phosphite
Bis[2,5-bis(alpha-methyl undecyl)-4-hydroxyphenyl] (dinonyl phenyl) phosphite
Bis[2,5-bis(alpha-methyl heptadecyl)-4-hydroxyphenyl] (nonyl phenyl) phosphite
Mono[2,5-di(alpha-methyl undecyl)-4-hydroxyphenyl] bis-(dinonyl phenyl) phosphite
Mono[2,5-di(alpha-methyl heptadecyl)-4-hydroxyphenyl] bis-(nonyl phenyl) phosphite
Mono[2,5-di-(alpha-methyl heptyl)-4-hydroxyphenyl] bis-(octyl phenyl) phosphite
Tris(2-alpha-methyl benzyl, 5-alpha-methyl heptadecyl-4-hydroxyphenyl) phosphite
Tris(2-alpha-methyl benzyl, 5-alpha-methyl undecyl-4-hydroxy-phenyl) phosphite
Bis(2-alpha-methyl benzyl, 5-alpha-methyl tridecyl-4-hydroxy-phenyl) (nonyl phenyl) phosphite
Bis(2-alpha-methyl benzyl, 5-alpha-methyl-heptadecyl-4-hydroxy-phenyl) (dinonyl phenyl) phosphite
Mono(2-alpha-methyl benzyl, 5-alpha-methyl undecyl-4-hydroxy-phenyl) bis(nonyl phenyl) phosphite
Tris(2-terphenyl, 5-alpha-methyl heptadecyl-4-hydroxyphenyl) phosphite
Tris(2-isobornyl, 5-alpha-methyl undecyl-4-hydroxyphenyl) phosphite
Bis(2-terphenyl, 5-alpha-methyl pentyl-4-hydroxyphenyl) (dinonyl phenyl) phosphite
Bis(2-terpenyl, 5-alpha-methyl heptadecyl-4-hydroxyphenyl) mono(nonyl phenyl) phosphite
Bis(2-isobornyl, 5-alpha-methyl undecyl-4-hydroxphenyl) mono phenyl phosphite
Mono(2-terphenyl, 5-alpha-methyl heptadecyl-4-hydroxy phenyl) bis octyl phenyl phosphite
Bis(2,5-ditertiary butyl-4-hydroxyphenyl)decyl phosphite
Bis[2,5-bis(alpha-methyl heptadecyl)-4-hydroxyphenyl] butyl phosphite
Mono[2,5-bis(alpha-methyl undecyl)-4-hydroxyphenyl] didecyl phosphite
Mono[2-alpha-methyl benzyl, 5-alpha-methyl pentadecyl-4-hydroxyphenyl)didecyl phosphite
Mono(2-terphenyl, 5-alpha-methyl heptadecyl-4-hydroxyphenyl) diodecyl phosphite
Phosphites prepared by reacting PCl$_3$ (⅓ mole) with the reaction product of hydroquinone with mixed C$_{12}$–C$_{16}$ alpha-olefins.
Phosphites prepared by reacting PCl$_3$ with a mixture of nonylated phenols and a reaction product of mixed C$_{14}$–C$_{18}$ alpha-olefins with hydroquinone.
Phosphites prepared by reacting PCl$_3$ with a mixture produced by reacting hydroquinone with C$_{16}$–C$_{20}$ alpha-olefins and turpentine.
Phosphites prepared by ester interchange reaction between tridecyl phosphite and the reaction product of hydroquinone with mixed C$_{14}$–C$_{16}$ alpha-olefins.
Phosphites prepared by ester interchange reaction between tributyl phosphite and the reaction product of hydroquinone with propylene trimer (mixed alpha-nonenes).
Phosphites produced by reacting PCl$_3$ (⅓ mole) with one mole of a mixture of substituted hydroquinones obtained by reacting 1 mole of hydroquinone with (a) one mole of mixed C$_{16}$–C$_{20}$ alpha-olefins and (b) one mole of styrene.
Phosphites produced by reacting PCl$_3$ with a mixture of substituted hydroquinones obtained by reacting hydroquinone with (a) mixed C$_{16}$–C$_{20}$ alpha-olefins and (b) turpentine.
Phosphites produced by reacting PCl$_3$ with a mixture of substituted hydroquinones obtained by reacting hydroquinone with (a) mixed C$_{16}$–C$_{20}$ alpha-olefins and mixed C$_6$–C$_{10}$ alpha-olefins.
Phosphites obtained by reacting PCl$_3$ with substituted hydroquinones prepared by reacting hydroquinone with (a) mixed C$_{14}$–C$_{16}$ alpha-olefins and (b) tripropylene.
Phosphites obtained by reacting PCl$_3$ with substituted hydroquinones prepared by reacting hydroquinone with (a) mixed C$_{10}$–C$_{12}$ alpha-olefins and (b) alpha-methyl styrene.
Phosphites obtained by reacting PCl$_3$ with substituted hydroquinones prepared by reacting hydroquinone with (a) mixed C$_{14}$–C$_{16}$ alpha-olefins and dipentene.

The following examples, in which all quantities are expressed by weight unless otherwise indicated will serve to illustrate the practice of the invention in more detail.

EXAMPLE I (a) Preparation of 2,5-bis(alpha-methyl undecyl hydroquinone

A mixture of 110 g. (1 mole) of hydroquinone, 336 g. (2 moles) of dodecene-1 and 5.5 g. of boron fluoride etherate was stirred and heated to 110° C. An exothermic reaction set in and the temperature rose spontaneously to 160° C. After the reaction subsided the mixture was heated at 140° C. for 1½ hours. The mix was then cooled to 130° C. and diluted with 500 ml. of hexane. A small quantity (5 g.) of unreacted hydroquinone was filtered off. The hexane solution was treated with anhydrous ammonia gas to destroy the boron fluoride catalyst and the ammonia-boron fluoride complex was filtered off, using diatomaceous earth as a filter medium. The product was transferred to a distilling apparatus and the hexane was removed. Following this some unreacted dodecene-1 (49 g.) was distilled off. 76 g. of material boiling between 166–233° C. (0.3 mm. pressure) was removed (largely mono alpha-methyl undecyl hydroquinone). 229 g. of 2,5-bis (alpha-methyl undecyl) hydroquinone was then obtained, boiling between 233–245° C. at 0.3 mm. pressure. Carbon-hydrogen analysis gave the following: Percent C found 80.98 (calculated 80.72); percent H found 12.08 (calculated 12.11). The molecular weight was determined to be 461, in good agreement with the theoretical (446).

(b) Tris[2,5-bis(alpha-methyl undecyl)-p-hydroxyphenyl] phosphite 114.5 g. (¼ mole) of bis(alpha-methyl undecyl) hydroquinone was stirred and heated to 60° C. as 11.5 g. (¹⁄₁₂ mole) of phosphorus trichloride was added dropwise, over ten minutes time. After completion of the addition the mixture was gradually heated (over 1 hour) to 200° C. and stirred at this temperature for 3 hours. Hydrogen chloride was evolved during this treatment. Carbon dioxide gas was finally introduced to sweep out residual HCl. The material was found to contain only traces of chlorine after this treatment. Analysis gave 2.27% phosphorus (theory, 2.16%). Finally, 1% of propylene oxide was added to the cooled product (a viscous fluid).

EXAMPLE II (a) Preparation of 2,5-bis(alpha-methyl heptadecyl) hydroquinone

A mixture of 110 g. (1 mole) of hydroquinone, 756 g. (3 moles) of octadecene-1, and 11 g. of acid-activated montmorillonite catalyst (Girdler KSFO) was gradually heated (with stirring) to 130° C. and then the temperature maintained between 130–140° C. for a period of three hours. The mix was cooled somewhat (60° C.) and the catalyst was filtered off. The product was placed in a distilling flask and 241 g. of unreacted octadecene-1 was distilled off (up to 260° C. at 10 mm. pressure). A residue consisting of bis(alpha-methyl heptadecyl)hydroquinone was obtained (607 grams). Analysis: Percent C found 81.98 (calculated 82.09); percent H found 12.89 (calculated 12.70). Molecular weight: found 616, calc. 614. The product, an oil, slowly set to a low melting solid.

(b) Preparation of tris[2,5-bis(alpha-methyl heptadecyl)-4-hydroxyphenyl]phosphite To 204.7 g. (⅓ mole) of bis(alpha-methyl heptadecyl) hydroquinone stirred and heated to 70° C. in a flask was added dropwise (over a period of 5 minutes) 15.3 g. (1½₂ mole) of phosphorus trichloride. The mixture was then heated gradually to 200° C. and kept at that temperature for four hours. After this period the evolution of hydrogen chloride was complete. Carbon dioxide was passed through the product to sweep out residual hydrogen chloride. The product was analyzed and found to contain 1.63% phophorous (theory 1.66%). 1% of propylene oxide was then added to the viscous fluid product.

EXAMPLE III (a) Preparation of 2,5-bis(alpha-methyl heptyl) hydroquinone

A mixture of 220 g. (2 moles) of hydroquinone, 560 g. (5 moles) of octene-1, and 11 g. of boron fluoride etherate were heated to 120° C. in a stirred flask. As 120° C. was reached an exothermic reaction took place and the mixture refluxed vigorously, the temperature rising to 135° C. The mix was heated for 1½ hours at 140° C. and cooled to 60° C. and a small quantity (2 g.) of unreacted hydroquinone was filtered off. Ammonia gas was passed through the fluid product and the solid ammonia-boron complex was filtered off. After distilling off 108 grams of recovered octene-1 the product was distilled under diminished pressure. 124 g. of material was removed boiling under 184° C. at 0.3 mm. Then 451 g. of 2,5-bis(alpha-methyl heptadecyl)hydroquinone was obtained boiling between 184–201° C. at 0.3 mm. Analyses: percent C found 79.3% (calculated 79.04); percent H found 11.58% (calculated 11.38). Molecular weight found 343 (calculated 334). The product was a light amber liquid.

(b) Preparation of tris[2,5-bis(alpha-methyl heptyl)-p-hydroxyphenyl] phosphite

In to a flask containing 167 g. (½ mole) of bis(alpha-methyl heptyl)hydroquinone at 65° C. was introduced (dropwise) 22.9 g. (⅙ mole) of phosphorus trichloride (10 minutes). The reaction mixture was heated gradually to 200° C. and held at that temperature for 3 hours to complete the evolution of hydrogen chloride. Carbon dioxide gas was passed through the mixture to sweep out residual HCl. Analysis of the product gave 2.74% phosphorus (theory 3.01%). This was a viscous fluid.

Valuable intermediates for phosphites can be made by reacting hydroquinone with mixtures of alpha-olefins.

EXAMPLE IV (a) $C_{14}$–$C_{16}$ alpha-olefin alkylated hydroquinone 893 g. (4 moles plus 10% excess) of a commercial mixture of tetradecene-1 and hexadecene-1 (average molecular weight=203) and 220 g. (2 moles) of hydroquinone were placed in a 3-liter flask. 22 g. of acid activated montmorillonite catalyst (KSFO) (10% based on the hydroquinone) was added. The mixture was stirred and heated to 130° C. An exothermic reaction set in and the temperature rose spontaneously to 155° C. Finally, the mix was heated to 175° C. for 2 hours. The catalyst was filtered off and the material heated to 260° C. under diminished pressure (13 mm.) to remove unreacted olefin and traces of hydroquinone.

This product (2,5-dialkylated hydroquinone) was reacted with $PCl_3$ to form a phosphite as follows:

(b) 258 g. (½ mole) of $C_{14}$–$C_{16}$ alpha-olefin alkylated hydroquinone was stirred and heated at 70° C. as 22.9 g. (⅙ mole) of phosphorus trichloride was dropped in over one hour. The mix was then heated to 200° C. for 1 hour. Carbon dioxide was passed through the mix to sweep out residual HCl. The material was analyzed, with the following results:

| | Percent |
|---|---|
| P calculated | 1.97 |
| P found | 1.95 |

2.7 g. of propylene oxide was added. The yield was 268 g.

EXAMPLE V

Reaction product of $C_6$–$C_{10}$ alpha-olefins and $C_{16}$–$H_{20}$ and olefins with hydroquinone (a) Two moles (220 g.) of hydroquinone was mixed with 22 g. of montmorillonite catalyst (KSFO) and 484 g. (2.0 moles) of a commercial mixture of alpha-olefins including even carbon olefins in the $C_{16}$–$C_{20}$ range. The mix was heated to 140° C. whereupon an exothermic reaction occurred. The temperature was maintained at 170° C. for 1 hour.

Then, 246 g. (2.2 moles) of mixture of alpha-olefins including even carbon olefins in the $C_6$–$C_{10}$ range was added slowly (temperature 150–160° C.). The mix was kept at this temperature for an additional hour and was then filtered to remove the catalyst. The material was heated to 220° under diminished pressure (10 mm.) whereupon 83 g. of distillate (unreacted olefin and hydroquinone) was removed. The residue (801 g.) was an amber fluid.

(b) One mole of the above product (464 g.) was heated to 70° C. and treated dropwise with 45.8 g. (⅓ mole) of phosphorus trichloride. It was then heated to 200° C. for 1½ hours. Carbon dioxide was bubbled through and 4.8 g. of propylene oxide was added. The product was analyzed for phosphorus. Percent P calculated 2.20%; percent P found 2.01.

EXAMPLE VI

Mono nonyl phenyl-bis[2,5-bis(alpha-methyl undecyl)-4-hydroxyphenyl] phosphite

Phosphorus trichloride (275 g.) (2.0 moles) was placed in a flask and stirred and warmed to 70° C. Mono nonyl phenol (220 g., 1 mole) was added slowly, over a period of one hour. After the addition was complete the mixture was heated to reflux (105° C.) for 90 minutes. Then the excess phosphorus trichloride was distilled off (131 g. recovered). The residue in the flask was essentially mono nonyl phenoxy phosphorus dichloride. A portion (80.25 g., ¼ mole) of this product was placed in an addition funnel and dropped slowly (over ½ hour) into 223 g. (½ mole) of bis(alpha-methyl undecyl)-hydroquinone at 80° C. After completion of the addition the mixture was heated gradually (over 1½ hours) to 200° C. and held at that temperature for an additional two-hour period. Carbon dioxide was bubbled through the hot material and it was allowed to cool. The product, mono nonyl phenyl bis [2,5-bis(alpha-methyl undecyl)-4-hydroxyphenyl]phosphite, (288 g.) was an amber fluid. Percent phosphorus calculated 2.72%; found 2.86%. 3 g. of propylene oxide was added to this material.

EXAMPLE VII

Bis[2,5-bis(alpha-methyl heptyl)-4-hydroxyphenyl]-mono-n-butyl phosphite

To 140 g. (0.42 mole) of 2,5-bis(alpha-methyl heptyl) hydroquinone (see Example III A) in a liter flask was added 52.5 g. (0.21 mole) of tri-n-butyl phosphite and 2.0 g. of diphenyl phosphite (catalyst—see U.S. Patent 3,053,878). The mixture was gradually heated to 250–260° C. and maintained at that temperature for a period of two hours. n-Butyl alcohol distilled slowly from the mixture and was condensed and recovered. A total of 30 g. of n-butyl alcohol was obtained (theory=31 g.; 0.42 mole). The product remaining in the flask was substantially pure bis[2,5-bis(alpha-methyl heptyl)-4-hydroxyphenyl]-n-butyl phosphite. This was a light yellow liquid.

EXAMPLE VIII

Reaction product of $C_{14}$–$C_{16}$ alpha-olefin alkylated hydroquinone and tridecyl phosphite 235.5 g. (0.5 mole) of tridecyl phosphite and 5 g. of diphenyl phosphite was added to 258 g. (0.5 mole) of the 2:1 reaction product of $C_{14}$–$C_{16}$ alpha-olefins and hydroquinone. The mixture was heated in a flask under diminished pressure (60 mm.) to 220° C. Decyl alcohol slowly distilled off. The temperature was slowly increased to 260° C. over 3½ hours. 78.9 g. of decyl alcohol was obtained (theory=79.0 g.). The residual product (414 g.) was analyzed.

Calculated percent P for

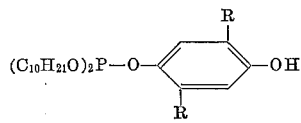

is 3.60%, where R is a 75/25 mix of $C_{14}H_{29}$ and $C_{16}H_{33}$ (percent P found 3.66%).

EXAMPLE IX $C_6$–$C_{10}$ alpha-olefin alkylated hydroquinone phosphite (a) Reaction of $C_6$–$C_{10}$ alpha-olefins and hydroquinone.—Two moles (220 g.) of hydroquinone, 22 g. of KSFO catalyst and 448 g. (4 moles) of mixed $C_6$–$H_{10}$ alpha-olefins were stirred and slowly heated. At 110° C. refluxing of the olefin commenced. Temperature slowly rose (over 2 hours) to 155° C. The mix was then stirred near 135° C. for two hours. It was then diluted with benzene and filtered from the catalyst. After removal of the benzene the product was heated to 220° C. in a distilling flask under diminished pressure (13 mm.). The yield of amber fluid was 570 g.

(b) Phosphite of above.—334 g. (1 mole) of the above reaction product of $C_6$–$C_{10}$ alpha-olefin alkylated hydroquinone was heated to 75° C. and 45.8 g. (⅓ mole) of $PCl_3$ was added dropwise. The mixture was then heated to 200° C. and held at that temperature for 1 hour. Carbon dioxide was passed through the product and to the cooled material was added 3.5 g. of propylene oxide. The yield was 343 g. percent P calculated 3.01%; percent P found 2.69%.

EXAMPLE X

Phosphite based on reaction product of hydroquinone, $C_6$–$C_{10}$ alpha-olefins and turpentine (a) 220 g. (2.0 moles) of hydroquinone and 22 g. KSFO catalyst suspended in 320 cc. of monochlorobenzene was heated to 134–136° C. as 224 g. (2 moles) of mixed $C_6$, $C_8$ and $C_{10}$ alpha-olefins (average molecular weight, 112) was added dropwise. After all the olefin was added the mixture was heated to gentle reflux whereupon the temperature rose gradually to 145° C. The mix was then allowed to cool to 135° C. and 272 g. (2 moles) of steam distilled turpentine was added dropwise (temperature between 134–138° C.). Finally the mixture was heated to 145° C. for ½ hour. The product was filtered (hot) and the light yellow filtrate was topped to 220° C. (10 mm. pressure). Removal of 122 g. of volatiles (mixture of olefins, turpentine and small quantity of hydroquinone) yielded 453 g. of product.

The above product was converted to the phosphite as follows:

(b) 45.8 g. (⅓ mole) of $PCl_3$ was added dropwise (20 min.) to 358 g. (1 mole) of the above reaction product of hydroquinone with $C_6$–$C_{10}$ alpha-olefins and turpentine (1:1:1). The temperature was kept near 75° C. Finally the mix was heated to 200° C. and stirred at that temperature for one hour. Carbon dioxide was passed through and then 3.8 g. of propylene oxide was added. The yield was 357 g. Analysis showed only a trace of chlorine and gave 2.69% P (theory 2.81% P).

A particularly valuable feature of certain chemicals of my invention is found in their high resistance to hydrolysis. This is of importance in applications where the materials are applied as aqueous emulsions. This is the case with emulsion polymerized polymeric materials such as butadiene-styrene copolymer, for example. Those examples of the present hydroquinone phosphite which contain higher molecular weight substituents (8 carbon atoms or more, usually 8 to 20 carbon atoms) such as octyl, nonyl, dodecyl, octadecyl, etc. are especially suited to uses where hydrolytic stability may be a problem.

The chemicals of the invention can be used alone or in combination with other antidegradients such as phenolic compounds (e.g. 2,6-di-tert, butyl p-cresol; tertiary alkylated bisphenol A,) aromatic amines (e.g. alkylated or styrenated diphenylamine), sulfur containing materials such as dialkyl thio dipropionates or hydroxy benzyl sulfide compounds, or may be used in combination with antioxidant synergists such as citric acid, tartaric acid, ascorbic acid, etc.

The chemicals of the invention are useful as stabilizers and in the antioxidant-antiozonant protection of diolefin polymer rubbers, in the unvulcanized state and in the vulcanized state. In this category I include natural rubber, synthetic polyisoprene, polybutadiene, butadiene-styrene copolymer, butadiene-acrylonitrile copolymer, graft polymer of styrene and acrylonitrile on polybutadiene isobutylene-isoprene copolymer, ethylene-propylene-non-conjugated diolefin (e.g., dicyclopentadiene, 1,4-hexadiene, methylene norbornene, cyclooctadiene, etc.) copolymer. Usually amounts of the chemical in the range of from 0.2 to 5.0 parts, per 100 parts by weight of rubber, are suitable. Particularly desirable stabilizer compositions are those containing (A) a chemical of the invention along with (B) a tris (alkyl phenyl) phosphite in which the alkyl phenyl radicals have one or two alkyl groups, and each alkyl group contains from 8 to 20 carbon atoms, the weight ratio of (A):(B) being from 9:1 to 1:9.

A very practical and valuable mode of use of the chemicals of my invention is to employ the chemicals in admixture with other antioxidants and stabilizers for elastomers and other materials subject to oxidative deterioration. Of particular value in the stabilization of styrene-butadiene rubber (SBR) for example, is a mixture of commercial nonylated phenyl phosphites (Polygard) and certain of my liquid phosphites formed from alpha-olefin alkylated hydroquinone. Not all of the hydroquinone phosphites lend themselves to this use. For example, tris (2,5 - ditertiary-butyl-4-hydroxyphenyl)phosphite (based on the reaction product of hydroquinone and isobutylene) is a high melting solid which is not soluble in Polygard. On the other hand, the phosphites derived from alpha-olefin alkylated hydroquinones (such as 2,5-bis (alpha-methyl undecyl)hydroquinone from hydroquinone and dodecene-1) are generally liquid products which are completely miscible with Polygard. These latter products can be blended with Polygard in any proportion and the resulting mixtures are readily emulsified in the normal manner and added to SBR latex. The polymer prepared from latex treated with these blends will be found to exhibit much improved resistance to oxidative degradation as compared to polymer containing only the nonylated phenyl phosphite. The color of such polymers is excellent.

It is surprising that alkylation of hydroquinone with simple alpha-olefins produces products which are much lower melting and much more soluble in organic materials than are the products formed by the interaction of branched olefins( such as isobutylene or isoamylene) and hydroquinone. Likewise the phosphites from the alpha-olefin alkylated hydroquinones are much lower melting and much more soluble in organic materials than are the corresponding phosphites from hydroquinones alkylated with these branched olefins. These differences are of practical importance in the application of the materials.

For example, the preferred method of incorporating stabilizers in SBR polymer involves the addition of an aqueous emulsion of a liquid stabilizing agent to the SBR latex prior to flocculation. The stabilizing agent may be a fluid itself or it may be a material which is soluble in a liquid. It will be seen that the alpha-olefin alkylated hydroquinone phosphites being liquid themselves (or quite soluble in liquids) are to be preferred. Stabilization of polypropylene, on the other hand, is usually accomplished by incorporation of solid stabilizing agents by a "tumbling" process. For this use the higher melting phosphites derived from tertiary alkylated hydroquinones may be preferred.

The effectiveness of alkylated hydroquinone phosphite compounds as stabilizers for synthetic rubber can be demonstrated by incorporating the chemicals in an effective amount in the rubber and noting the time required to bring about detectable deterioration of the polymer under accelerated aging conditions. A convenient method for detecting oxidation of the polymer is to observe the development of a carbonyl absorption band in the infrared spectrum of thin films of polymer. The use of infrared spectrophotometry in following the oxidation of polymer films has been described by Bishop [Anal. Chem. 33,456 (1961)].

In order to demonstrate the practical utility of my chemicals I have incorporated these in a commercial latex of styrene and butadiene copolymer and have flocculated, washed and dried the polymer using a procedure similar to that described in my earlier patent (U.S. 2,733,226). The quantity of chemical employed in the following examples was 1.25 parts per 100 parts of polymer. However, greater or lesser amounts of chemicals may be used. The dry polymer containing the stabilizing chemical was dissolved in benzene (5% concentration). A few drops of the polymer solution was applied to the surface of a circular sodium chloride crystal (1″ diameter) and distributed evenly over the surface. Upon evaporation of the solvent the polymer was deposited as a thin film on the salt plate.

An infrared spectrum was obtained on the unaged sample and subsequently after aging of the plate in a circulating air oven at 130° C., for periods of time varying from ½ hour to 40 or more hours. Oxidation of the polymer is detected by the appearance of a carbonyl absorption band in the 5.7–6.0 micron range. (It was observed that oftentimes a small but definite carbonyl band will appear on the spectrum of the unaged polymer but this rapidly disappears as the polymer is heated in the oven for a short time. Later on, as oxidation sets in, the carbonyl band reappears and increases greatly as oxidation proceeds. The original carbonyl band in the unaged samples is probably due to the presence of fatty acid material in the polymer which volatilizes away as the polymer is heated).

The following data illustrate the antioxidant properties of our hydroquinone phosphite stabilizers:

| Chemical | Hours to oxidize (130° C.) |
|---|---|
| No stabilizer | ½ |
| R.P. of PCl$_3$ (1 mole) with 3 moles of R.P. C$_{16}$-C$_{20}$ α-olefins and hydroquinone (2:1) | 42 |
| R.P. of PCl$_3$ (1 mole) with 3 moles of R.P. C$_{12}$-C$_{16}$ α-olefins and hydroquinone (2:1) | 30 |
| R.P. of PCl$_3$ (1 mole) with 3 moles of R.P. C$_6$-C$_{10}$ α-olefins and hydroquinone (2:1) | 30 |
| R.P. of PCl$_3$ (1 mole) with 3 moles of R.P. C$_{16}$-C$_{20}$ α-olefins, turpentine and hydroquinone (1:1:1) | 34 |
| R.P. of PCl$_3$ (1 mole) with 3 moles of R.P. C$_{12}$-C$_{16}$ α-olefins, turpentine and hydroquinone (1:1:1) | 30 |
| R.P. of PCl$_3$ (1 mole) with 3 moles of R.P. C$_6$-C$_{10}$ α-olefins, turpentine and hydroquinone (1:1:1) | 22 |
| R.P. of PCl$_3$ (1 mole) with 3 moles of R.P. C$_{12}$-C$_{16}$ α-olefins, styrene and hydroquinone (1:1:1) | 38 |
| R.P. of PCl$_3$ (1 mole) with 3 moles of R.P. C$_{12}$-C$_{20}$ α-olefins, styrene and hydroquinone (1:1:1) | 41 |
| R.P. of PCl$_3$ (1 mole) with 3 moles of R.P. C$_6$-C$_{10}$ α-olefins, styrene and hydroquinone (1:1:1) | 30 |
| R.P. of PCl$_3$ (1 mole) with 3 moles of R.P. C$_6$-C$_{10}$ α-olefins, d-limonene and hydroquinone (1:1:1) | 27 |
| R.P. of PCl$_3$ (1 mole) with 3 moles of R.P. C$_{16}$-C$_{20}$ α-olefins, C$_6$-C$_{10}$ α-olefins and hydroquinone (1:1:1) | 24 |
| R.P. of PCl$_3$ (1 mole) with 3 moles of R.P. Octene-1, styrene and hydroquinone (1:1:1) | 24 |
| R.P. of PCl$_3$ (1 mole) with 3 moles of R.P. C$_{16}$-C$_{20}$ α-olefins, styrene and hydroquinone (1:1:1) | 30 |
| R.P. of PCl$_3$ (1 mole) with 3 moles of R.P. C$_{16}$-C$_{20}$ α-olefins, camphene and hydroquinone (1:1:1) | 39 |
| R.P. of PCl$_3$ (1 mole) with 3 moles of R.P. C$_{16}$-C$_{20}$ α-olefins, dipentene and hydroquinone (1:1:1) | 30 |
| R.P. of PCl$_3$ (1 mole) with 3 moles of R.P. C$_{14}$-C$_{18}$ α-olefins, turpentine and hydroquinone (1:1:1) | 33 |
| R.P. of PCl$_3$ (1 mole) with 3 moles of R.P. C$_{14}$-C$_{18}$ α-olefins and hydroquinone (2:1) | 33 |

The effectiveness of mixtures of alkylated aryl phosphites (such as those described in U.S. Patent 2,733,226) and our alkylated hydroquinone phosphites is shown in the following data. The samples were prepared and tested as indicated above:

| Ratio nonylated aryl phosphite/ hydroquinone phosphite | Hydroquinone phosphite compound | Hours to oxidize (130° C.) |
|---|---|---|
| 80/20 | R.P. C$_{16}$-C$_{20}$ α-olefins, hydroquinone (2:1) and PCl$_3$ (1/3 mole). | 21 |
| 80/20 | R.P. C$_{12}$-C$_{16}$ α-olefins, hydroquinone (2:1) and PCl$_3$ (1/3 mole). | 20 |
| 80/20 | R.P.dodecene-1 hydroquinone (2:1) and PCl$_3$ (1/3 mole). | 27 |
| 80/20 | R.P. C$_{16}$-C$_{20}$ α-olefins, styrene, hydroquinone (1:1:1) and PCl$_3$ (1/3 mole). | 12 |
| 80/20 | R.P. C$_{14}$-C$_{18}$ α-olefins, turpentine, hydroquinone (1:1:1) and PCl$_3$ (1/3 mole). | 23 |
| 80/20 | R.P. C$_{16}$-C$_{20}$ α-olefins, turpentine, hydroquinone (1:1:1) and PCl$_3$ (1/3 mole). | 23 |

Having thus described my invention, what I claim and desire to protect by Letters Patent is:

1. A chemical of the formula $$(LO)_xP(OM)_y$$

wherein each M is an alkyl group having 4 to 18 carbon atoms or an alkylated phenyl group having 10 to 24 carbon atoms, $x$ is from 1 to 3, $y$ is from 0 to 2, and $x$ plus $y$ equals 3, and each L is a 4-hydroxy phenyl radical of the formula

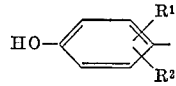

wherein $R^1$ is selected from secondary alkyl having from 3 to 28 carbon atoms, terpenyl having 10 carbon atoms, and aralkyl having 8 or 9 carbon atoms, and $R^2$ is selected from hydrogen, and the values previously given for $R^1$.

2. A chemical as in claim 1 in which the substituents on the 4-hydroxy phenyl radical occupy the 2- and 5- positions and $R^2$ is other than hydrogen.

3. A chemical as in claim 2 in which $x$ is 3 and $y$ is 0.

4. A chemical as in claim 2 in which $R^1$ and $R^2$ are secondary alkyl groups having from 3 to 28 carbon atoms.

5. A chemical as in claim 2 in which $R^1$ and $R^2$ are secondary alkyl groups containing 6–20 carbon atoms.

6. A chemical as in claim 2 in which $R^1$ is a secondary alkyl group having from 6 to 20 carbon atoms and $R^2$ is an aralkyl group having 8 or 9 carbon atoms.

7. A chemical as in claim 2 in which $R^1$ is a secondary alkyl group having from 6 to 20 carbon atoms and $R^2$ is a terpenyl group having 10 carbon atoms.

8. A chemical as in claim 2 in which $x$ is 2, $y$ is 1 and M is an alkyl phenyl having 10 to 24 carbon atoms.

9. A chemical as in claim 2 in which $x$ is 2, $y$ is 1 and M is alkyl having 4 to 18 carbon atoms.

References Cited

UNITED STATES PATENTS 3,112,286  11/1963  Morris et al. _____ 260—953 X

JOSEPH P. BRUST, Primary Examiner

ANTON H. SUTTO, Assistant Examiner

U.S. Cl. X.R.

260—967, 45.7, 45.95, 814, 976, 982, 29.7, 810, 815